United States Patent

Angello

[15] 3,654,544

[45] Apr. 4, 1972

[54] THERMAL EQUILIBRIUM REGULATOR FOR A THERMOELECTRIC POWER SOURCE

[72] Inventor: Joseph P. Angello, Eatontown, N.J.

[73] Assignee: The United States of America as represented by the Secretary of the Army

[22] Filed: Jan. 13, 1970

[21] Appl. No.: 2,614

[52] U.S. Cl. ................................................. 322/2
[51] Int. Cl. .............................................. H02n 3/00
[58] Field of Search .............. 310/4; 318/609, 610; 322/2

[56] References Cited

UNITED STATES PATENTS

| | | | |
|---|---|---|---|
| 3,018,430 | 1/1962 | Pack | 322/2 |
| 3,295,033 | 12/1966 | Davis et al. | 318/609 |
| 2,935,677 | 5/1960 | Lemmerman et al. | 322/2 |
| 2,915,652 | 12/1959 | Hatsopoulos et al. | 322/2 X |

Primary Examiner—Gene Z. Rubinson
Attorney—Harry M. Saragovitz, Edward J. Kelly, Herbert Berl and Jess J. Smith, Jr.

[57] ABSTRACT

This invention relates to an automatic device used to control a desired amount of fuel injected into the combustion system of a thermoelectric power source. The electrical output capability of the thermopile is sensed and this signal is used to control the speed of an electrically driven fuel pump thereby maintaining the thermopile in a condition of thermal equilibrium, regardless of liquid fuel type used or load condition imposed.

5 Claims, 4 Drawing Figures

Patented April 4, 1972

3,654,544

INVENTOR.
JOSEPH P. ANGELLO

THERMAL EQUILIBRIUM REGULATOR FOR A THERMOELECTRIC POWER SOURCE

This invention described herein may be manufactured, used, and licensed by or for the Government for governmental purposes without the payment to me of any royalty thereon.

BACKGROUND AND SUMMARY OF THE INVENTION

Thermoelectric generators are devices that convert heat energy directly into electric energy. Such devices are generally composed of a heat source, heat sink, thermopile, and a load. The power converted from heat to electricity is dependent upon the materials used, the temperatures of the heat source and heat sink, the electrical and thermal design of the thermocouples that form the thermopile, and the load. This invention is concerned with such a thermoelectric power system and the automatic control thereof.

In the device of the instant invention, a liquid hydrocarbon fuel is pumped to a burner, the hot exhaust gasses of which are used to heat one side of a thermopile. The other side of the thermopile is provided with a cooling means in the form of an electric fan that is run by a separate power supply and is independent of the fuel pump power supply thereby producing a temperature differential across the thermopile with the resultant electrical power generation. A load is connected to the output of the thermopile. The output capability of the thermopile is sensed and the sensed signal is used to control the speed of the pump supplying fuel to the burner.

In the device of the instant invention, the fuel pump motor is driven at a preset maximum speed when the sense signal is zero and such speed is gradually reduced to a preset fixed value as the magnitude of the sensed signal increased as will be more fully explained hereafter. By initially operating the fuel pump motor at a preset maximum speed, a large amount of heat is released at start-up when the system is cold thereby overcoming the thermal inertia of the system and reducing warm-up time. Operating the fuel pump motor at a preset maximum speed and subsequently decreasing the motor speed as the system warms up to its full output capability maintains the system in thermal equilibrium, i.e., essentially producing a sufficient amount of heat or heat flux to maintain a temperature differential and prevent thermal runaway and/or insufficient heating.

The system of the instant invention has been designed to accommodate various fuels including gasoline, kerosene, JP 4, JP 5, diesel fuel, etc., and can be used with thermopiles having different thermal characteristics.

BRIEF DESCRIPTION OF THE DRAWINGS

The exact nature of this invention will be readily apparent from consideration of the following specification relating to the annexed drawing in which.

DESCRIPTION OF THE PREFERRED EMBODIMENT

Figure 1:
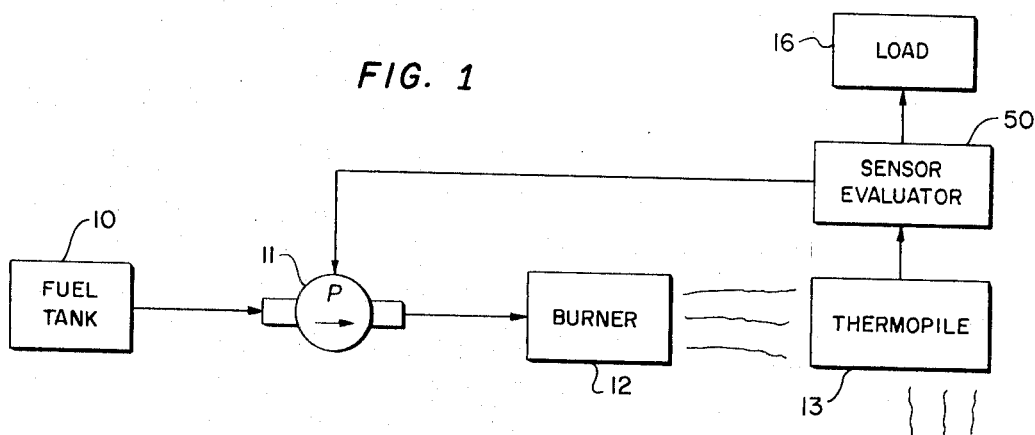
FIG. 1 shows a thermoelectric power source to which the instant invention is directed.

Referring now to the drawings, wherein like reference characters designate like or corresponding parts throughout the several views, there is shown in FIG. 1 a thermoelectric power source having a fuel tank 10 that supplies the system with any suitable liquid hydrocarbon fuel as heretofore disclosed. The fuel is drawn from tank 10 by means of pump 11, operating at a preset maximum speed that feeds burner 12. The hot exhaust gasses of burner 12 pass through one side of thermopile 13 as the other side of thermopile 13 is cooled by means of fan 14. The thermopile 13 produces an electrical output that passes through sensor-evaluator 50 and to a utilization means such as load 16. Sensor-evaluator 50 feeds a signal to fuel pump 11 to meter the fuel flow to burner 12 within the limits of operation of thermopile 13 thereby maintaining the system in thermal equilibrium.

Figure 2:
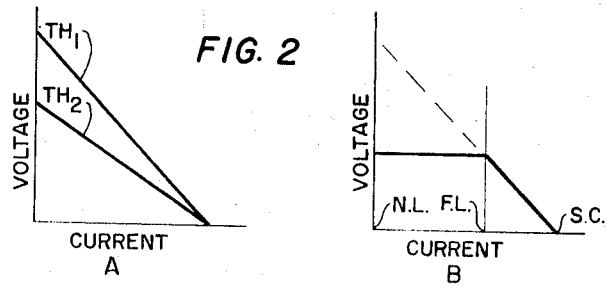
FIGS. 2A and 2B respectively show the voltage-current characteristic for an ideal thermopile and the regulated thermopile of the instant invention.

Ideally when heat is supplied to a thermopile, and thermal equilibrium is established, the temperature differential across the thermoelements defines the voltage-current characteristic of the thermopile as shown in FIG. 2A. Since cooling air flow to one side of the thermopile is constant and the thermal resistance of the thermopile is fixed, the temperature differential across the thermoelements is determined by the amount of heat supplied to the thermopile which also establishes the hot side temperature. FIG. 2A shows the linear relationship between voltage and current with a fixed temperature differential across the thermoelements for a selected hot side temperatures $Th_1$ and $TH_2$, $TH_1$ being the greater temperature. In using the thermopile output to drive or control the fuel pump, it can be seen from FIG. 2A that as the load current from the thermopile would increase, the voltage available to drive the pump would decrease thereby decreasing the speed of the pump. When the pump speed is decreased, less fuel would be available to heat the thermopile therefore the thermopile characteristic would lower to that of $TH_2$ to further decrease the available power from the thermopile, and so on.

By regulating the output voltage of the thermopile at a predetermined level and operating the fuel pump with the control herein disclosed, the output of the thermopile may be utilized to its fullest extent. The solid line in FIG. 2B shows the voltage current relationship of the shunt regulated output of the instant invention. (The voltage regulation circuitry itself forms no part of the instant invention.) It is noted in FIG. 2B that the regulated voltage of the device of the instant invention remains constant from no load, N.L., to the full load, F.L. condition and thereafter approximates the ideal voltage current characteristic of the thermopile to short circuit, S.C. Where the pump speed is controlled directly by the voltage output, as, for example, placing the pump in parallel with the thermopile, the pump speed would decrease beyond the full load condition as the voltage out of the thermopile decreases toward the short circuit point on the voltage current curve, thus creating the situation of insufficient fuel supply. If a shunt voltage, caused by thermopile current, were used to control the speed of the pump, the pump speed would increase as the current increased beyond the full load condition causing thermal runaway as the voltage out of the thermopile decreases to the short circuit, S.C., point on the voltage-current curve as shown by the dotted line of FIG. 2B.

Figure 3:
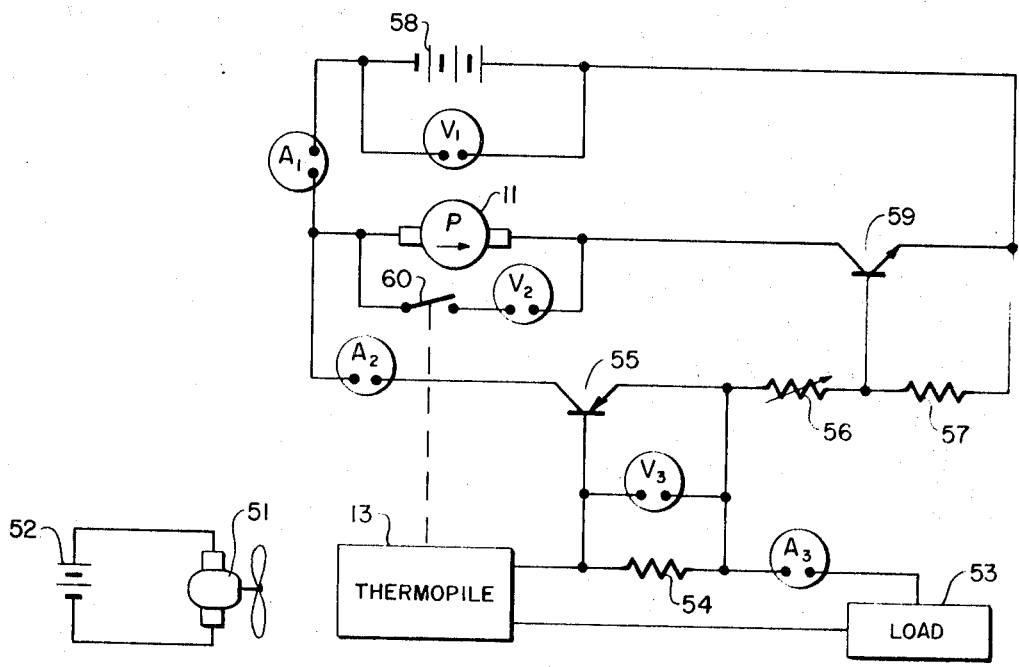
FIG. 3 shows the control circuitry of the instant invention.

There is shown in FIG. 3 the circuitry of the sensor-evaluator of the instant invention including fan 51 powered by a separate 28 volt, 1.5 amp. supply 52. Across the thermopile 13 output is the load 53 and in series with the load 53 is shunt resistor 54 across which the base and emitter of transistor 55 are connected. Although shunt resistor 54 is shown in the negative T.P. output, it may be placed in the positive thermopile 13 output with satisfactory results. The emitter of transistor 55 is connected to variable resistor 56 and resistor 57. Connected to resistor 57 is the 24 volt pump power supply 58 that is connected to collector of transistor 55. The base of transistor 59 is connected between resistors 56 and 57 while the emitter of transistor 59 is connected to the other side of resistor 57 and to the positive terminal of battery 58. The collector of transistor 59 is connected to fuel pump 11 while the collector of transistor 55 is likewise connected across pump 11 and thermal switch 60. Thermal switch 60 is provided to turn the pump motor 11 off if the thermopile exceeds a preset temperature level. Various voltmeters and ammeters may be connected in the circuitry for test or other purposes as indicated in FIG. 3.

Shunt resistor 54 may be placed in either the positive or negative leg feedthrough of the thermopile 13, as heretofore mentioned, and its resistance should be kept to a minimum since it is a parasitic load on the thermopile.

The following data was recorded with resistor 56 at 300 ohms, $V_1$ fixed at 23 volts, and with a simulated thermopile no load voltage of 20 volts ($A_3$=0 amps).

| $V_2$ (Volts) | $V_3$ (Volts) | $A_1$ (Milliamp.) | $A_2$ (ma.) | $A_3$ (Amps.) |
|---|---|---|---|---|
| 20.0 | 0.000 | 54.0 | 0 | 0 |
| 20.0 | 0.027 | 54.0 | 0 | 1.0 |
| 20.0 | 0.054 | 54.0 | 0 | 2.0 |
| 20.0 | 0.081 | 54.0 | 0 | 3.0 |
| 20.0 | 0.008 | 54.0 | 0 | 4.0 |
| 20.0 | 0.185 | 54.0 | 0+ | 5.0 |
| 19.95 | 0.162 | 53.8 | 1.0 | 6.0 |
| 19.90 | 0.189 | 53.7 | 4.1 | 7.0 |
| 19.30 | 0.216 | 53.4 | 13.3 | 8.0 |
| 18.85 | 0.243 | 53.3 | 27.2 | 9.0 |
| 18.50 | 0.270 | 53.1 | 36.0 | 10.0 |
| 18.20 | 0.297 | 53.1 | 41.0 | 11.0 |
| 18.00 | 0.324 | 53.1 | 45.3 | 12.0 |
| 17.80 | 0.351 | 53.0 | 49.0 | 13.0 |
| 17.70 | 0.378 | 52.8 | 51.0 | 14.0 |
| 17.50 | 0.405 | 52.0 | 55.0 | 15.0 |
| 17.40 | 0.432 | 52.0 | 57.0 | 16.0 |
| 17.40 | 0.459 | 52.0 | 57.0 | 17.0 |
| 17.40 | 0.486 | 52.0 | 57.0 | 18.0 |
| 17.40 | 0.513 | 52.0 | 57.0 | 19.0 |
| 17.40 | 0.540 | 52.0 | 57.0 | 20.0 |
| 17.40 | 0.594 | 52.0 | 57.0 | 22.0 |
| 20.0 | 0 | 54.0 | 0 | 0 |

It is noted from the above data that the pump voltage, $V_2$ remained at the regulated or full load value of 20 volts until the output current reached 6 amps and thereafter dropped gradually to 17.4 volts thereby maintaining the pump initially at full rpm and thereafter a fixed rpm to insure thermal equilibrium of the system even though the current $A_3$ increased.

To increase regulated load voltage of the pump 11, power supply 58 may be increased. The voltage difference between $V_1$ and $V_2$ is due mainly to resistance 57 and with smaller values of resistance, i.e., less than 47 ohms, the voltage difference between $V_1$ and $V_2$ will be less. If it is desired to vary the pump rpm because of the use of various fuels or for other reasons, resistance 56 may be varied. Increasing the value of resistor 56 has the effect of increasing the pump 11 voltage.

In the device actually constructed, the thermopile 13 was manufactured by Minnesota Mining and Manufacturing Co. and was rated at 560 watts (regulated to 28 volts D.C.). Fuel pump 11 as a model 1138 manufactured by Micropump. Shunt resistor 54 had a value of 0.027 ohms and may be placed in the positive or negative leg feedthrough of thermopile 13 as heretofore mentioned; resistor 57, 47 ohms while transistor 55 was a 2N331 and transistor 59 was a 2N1480. Resistor 56 was variable 0–1000 ohms and 0–10K ohms. It has been found that the unit has a start, warm-up, to full load time of less than five minutes as shown by the following data:

| TIME | $V_2$ (volts) | $V_3$ (volts) |
|---|---|---|
| Start | 20.3 | 0 |
| 00:30 | 20.3 | 0 |
| 01:00 | 20.3 | 0 |
| 01:30 | 20.3 | 0 |
| 02:00 | 20.2 | 0.20 |
| 02:30 | 19.4 | 0.34 |
| 03:00 | 19.4 | 0.42 |
| 03:30 | 19.4 | 0.46 |
| 04:00 | 19.4 | 0.47 |
| 05:00 | 19.4 | 0.50 |
| 06:00 | 19.4 | 0.51 |

It should be understood of course, that the foregoing disclosure relates to only a preferred embodiment of the invention and that numerous modifications or alterations may be made therein without departing from the spirit and scope of the invention.

What is claimed is:

1. A thermoelectric generator system for converting heat energy into electrical energy, comprising:
   a heat source;
   a heat sink;
   a thermopile exposed to and influenced by said heat source and said heat sink;
   a load electrically connected to said thermopile; and
   a control means connected between said load and said thermopile, said control means including a sensor connected in series with said load and said sensor electrically connected to a fuel pump that provides a liquid hydrocarbon fuel to said heat source wherein voltage developed across said sensor regulates the voltage of said fuel pump for controlling the fuel flow rate through the fuel pump to maintain said thermopile in thermoequilibrium.

2. The thermoelectric generator system according to claim 1 and further comprising that:
   said control means includes a regulation means for operating said fuel pump at a predetermined maximum rpm from no load to full load, and;
   said control means further includes means for decreasing the rpm of said fuel pump beyond full load thereby maintaining the thermopile in thermoequilibrium as said thermopile is operated above full load.

3. A regulated thermoelectric generator system for converting hydrocarbon fuel into electric energy comprising:
   a thermopile having a hot side, a cold side, and at least one pair of outlet connections;
   fan means for cooling said cold side of said thermopile;
   burner means for combusting said hydrocarbon and for heating said hot side of said thermopile;
   an electrically driven fuel pump means for supplying hydrocarbon fuel to said burner means;
   a load connected to said outlet connection of said thermopile, and;
   sensor means connected in series with said load for controlling said fuel pump means.

4. A thermoelectric generator system for converting hydrocarbon fuel into electric energy according to claim 3 and further comprising that:
   said sensor means is a resistor; and,
   transistor control circuitry including a power supply connected across said resistor for controlling said fuel pump means.

5. A thermoelectric generator system for converting hydrocarbon fuel into electric energy according to claim 4 and further comprising that:
   said transistor control circuitry includes a first transistor having a base and emitter connected across said sensor resistor, the collector of said first transistor being connected to said fuel pump means and to said power supply;
   a second transistor having its collector connected to said fuel pump means, its base connected through a variable resistor to the emitter of said first transistor, and;
   the emitter of said second transistor is connected to the base of said second transistor through a fixed resistor and to said power supply thereby producing a regulated thermopile output that controls the voltage across said fuel pump means in such a manner that said thermopile operates at a constant regulated voltage from no load to full load and at thermal equilibrium thereafter to load short circuit.

* * * * *